United States Patent
Lang

(10) Patent No.: US 7,477,971 B2
(45) Date of Patent: Jan. 13, 2009

(54) PROCESS FOR TRIGGERING A HEATER FOR MOTOR VEHICLES

(75) Inventor: Alexander Lang, Munich (DE)

(73) Assignee: Webasto AG (DE)

( * ) Notice: Subject to any disclaimer, the term of this patent is extended or adjusted under 35 U.S.C. 154(b) by 489 days.

(21) Appl. No.: 11/237,833

(22) Filed: Sep. 29, 2005

(65) Prior Publication Data

US 2006/0089758 A1    Apr. 27, 2006

(30) Foreign Application Priority Data

Oct. 25, 2004    (DE)    ........................ 10 2004 051 989

(51) Int. Cl.
B60R 16/02    (2006.01)
H04Q 7/20    (2006.01)
(52) U.S. Cl. ............................................. 701/36; 701/2
(58) Field of Classification Search .................... None
See application file for complete search history.

(56) References Cited

U.S. PATENT DOCUMENTS 6,526,335 B1* 2/2003 Treyz et al. .................... 701/1

2003/0097207 A1* 5/2003 Landgraf et al. ............... 701/2
2003/0152088 A1* 8/2003 Kominami et al. ......... 370/401
2004/0158371 A1* 8/2004 Iggulden et al. ............. 701/29

FOREIGN PATENT DOCUMENTS

DE    100 19 895 A1    11/2001

* cited by examiner

Primary Examiner—Michael J. Zanelli
(74) Attorney, Agent, or Firm—Dickinson Wright, PLLC; John M. Naber

(57) ABSTRACT

A process for triggering a heater (10) for motor vehicles having a data memory (16) in which a first computer (20) is connected via an Internet connection (22) to a second computer (24), and at the request of the first computer (20), the second computer (24) transmits a first heater operating data sequence (26) to the first computer (20). Then, the first computer (20) transmits a second heater operating data sequence (28) which is dependent on the first heater operating data sequence (26) to the data memory (16). The first and the second heater operating data sequences (26, 28) contain at least information about the number of starting processes permissible for the heater (10).

11 Claims, 2 Drawing Sheets

PROCESS FOR TRIGGERING A HEATER FOR MOTOR VEHICLES

BACKGROUND OF THE INVENTION

1. Field of Invention

The invention relates to a process for triggering a heater for motor vehicles.

2. Description of Related Art

In known processes for triggering heaters for motor vehicles, the heater is triggered either by a simple wireless remote control or a mobile telephone with suitable equipment. Thus, German Patent Application DE 100 19 895 A1 discloses a process for triggering an auxiliary motor vehicle device, especially an auxiliary motor vehicle heater, in which a WAP-enabled mobile telephone communicates with a computer via a mobile radio telephone network with an Internet interface. Software for triggering the auxiliary motor vehicle device runs on the computer, the computer communicating with the auxiliary motor vehicle device over the mobile radio telephone network.

SUMMARY OF THE INVENTION

In order to achieve improved triggering of the heater for motor vehicles, it is provided in accordance with the present invention that a data memory is assigned to the heater and a first computer is connected to the data memory, and the first computer is connected over an Internet connection to a second computer, first, and at the request of the first computer, the second computer transmits a first heater operating data sequence to the first computer, and then, the first computer transmits a second heater operating data sequence which is dependent on the first heater operating data sequence to the data memory. The first and the second heater operating data sequences comprises at least information about the number of starting processes of the heater.

The basic idea of the invention is that a first computer, which can be connected over an Internet connection to a second computer which is used as a server computer, is available to a user who is, for example, the user of a motor vehicle heater. On the second computer, for example, on an Internet page which is operated by the provider of the motor vehicle heaters and which is secured at least partially by a password, there is information about user-specific authorizations for operating a motor vehicle heater. This information which is accessible to the user on the Internet page of the second computer can be downloaded onto the first computer, and then, can be relayed to the heater over a connection to the data memory. For example, on the Internet page which is configured on the second computer, information is available to the user about the still available number of starting processes of the heater. The number of starting processes of the heater on the Internet page of the second computer accessible to the user can be increased by a financial transfer of the user, for example, to the account of the provider of the vehicle heaters.

It is advantageous if the data memory is located in a remote control. In one especially advantageous embodiment, the heater has a remote control receiving unit and the remote control transmits, via the remote control receiving unit, a heater activation command to the data memory which is dependent on the second heater operating data sequence. In this case, the number of starting processes is downloaded onto the data memory in the remote control and the heater can be started via the remote control according to the number of starting processes loaded in the data memory.

In another preferred embodiment, the data memory is located in the heater. It is especially preferred if the data memory and the first computer have a USB connection and the second heater operating data sequence is transmitted from the first computer to the data memory by means of a data storage medium which has a USB connection. The data storage medium can be, for example, a memory stick to which the second heater operating data sequence is transmitted by the first computer in a first step. The memory stick with the USB connection is then connected to the USB connection of the data memory of the auxiliary heater, by which new starting processes are loaded into the data memory for the heater for motor vehicles.

In another preferred embodiment, the data memory and the first computer each have an infrared interface, and the second heater operating data sequence is transmitted from the first computer to the data memory over the infrared interface. In this case, the second heater operating data sequence can be transmitted especially easily from the first computer to the data memory in the remote control or directly to the data memory in the heater.

The invention is explained in detail below with reference to the accompanying drawings which show preferred embodiments of the invention.

DETAILED DESCRIPTION OF THE INVENTION

Figure 1:
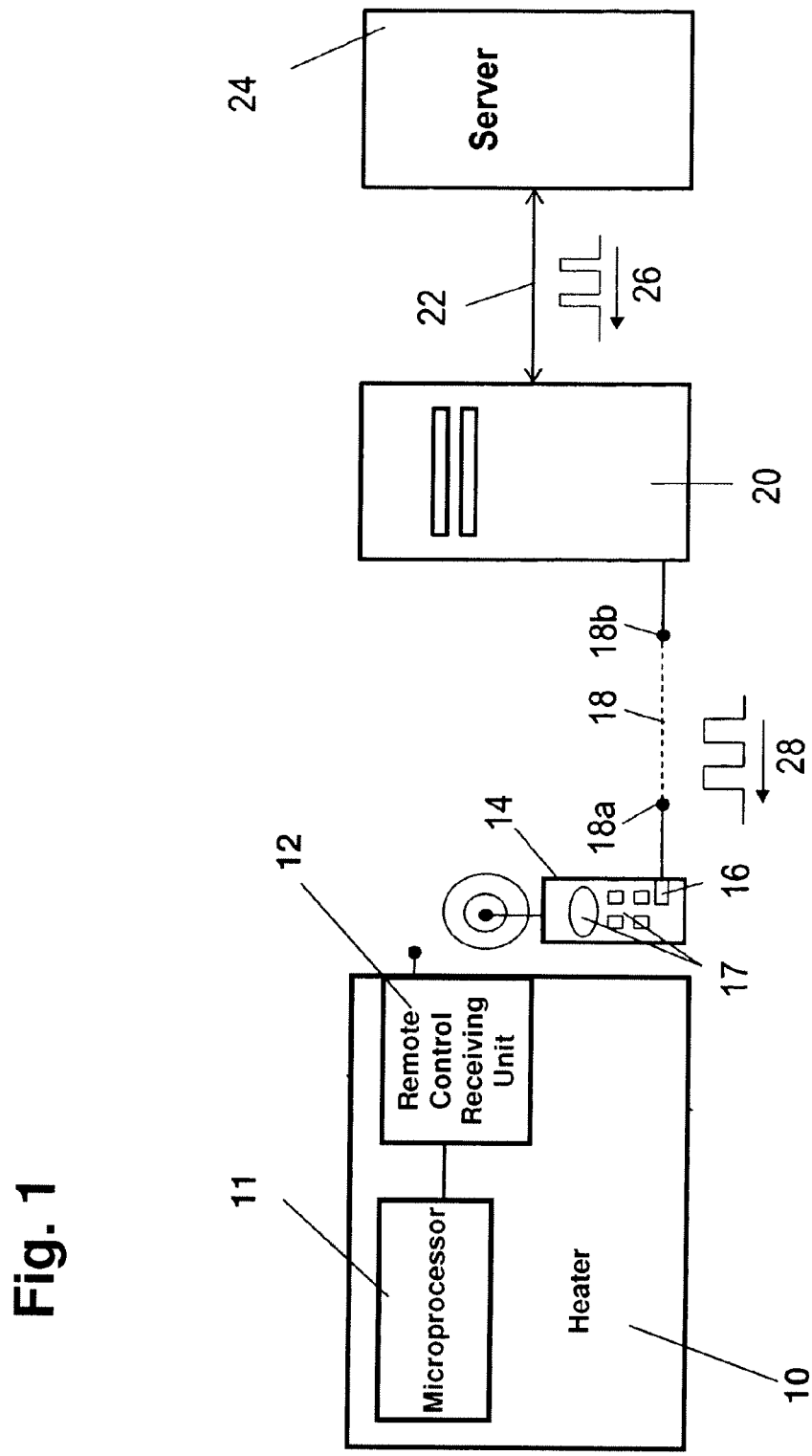
FIG. 1 is a schematic representation of an arrangement for executing the process for triggering a heater for motor vehicles in a first embodiment.

The arrangement which is shown in FIG. 1 for executing the process for triggering a heater for motor vehicles has a heater 10 for motor vehicles which comprises a microprocessor 11 with a program filed on it for operating the heater 10 and a remote control receiving unit 12 which is connected to the microprocessor 11. A remote control 14, which has a data memory 16 and display and input means 17, is assigned to the heater 10.

The remote control 14 is connected via a connection 18 to a first computer 20, the connection 18 being implemented by two infrared interfaces 18a, 18b. The connection 18 between the remote control 14 and the first computer 20 can, however, also be made via USB connections 18c, 18d, as shown in the embodiment from FIG. 2 where a data storage medium with a USB connection 30 is used as a transmission unit.

The first computer 20 is connected to the second computer 24 over an Internet connection 22. From the second computer 24, in response to a request by the first computer 20, a first heater operating data sequence 26 can be transmitted from the second computer 24 to the first computer 20, and a second heater operating data sequence 28 can be transmitted from the first computer 20 to the data memory 16.

The process for triggering a heater 10 for motor vehicles will be explained in detail below.

Via the first computer 20, which, for example, can be set up at the user of the motor vehicle heater 10 or in a motor vehicle shop, an Internet connection 22 is established to the second computer 24 which is used as a server and comprises an Internet website and a database of a provider of heaters. Via a secure access, the user is able to query the current status of starting processes for the motor vehicle heater 10 and to load restart processes by an amount of money being transferred to the provider of the heaters for motor vehicles. The requested first heater operating data sequence 26 is transmitted from the second computer 24 to the first computer 20. Then, the user of the heater 10 for motor vehicles or the motor vehicle shop can transmit the second heater operating data sequence 28 via the connection 18 to the data memory 16 in the remote control 14.

The first and second heater operating data sequences 26, 28 contain at least information about the number of starting processes of the heater 10.

The motor vehicle heater 10 can be started at this point according to the number of starting processes filed in the data memory 16 via the remote control 14 by means of the program filed on the microprocessor 11 for operating the motor vehicle heater 10. Each time the motor vehicle heater 10 is turned on, the number of starting processes of the heater in the data memory 16 is reduced by one. For a small number of starting processes in the data memory 16, the program filed on the microprocessor 11 initiates a display (not shown) on the heater 10 in order to call to the attention of the user the necessity of reloading the data memory 16. If the number of starting processes in the data memory 16 has dropped to zero, the heater 10 can no longer be started unless a second heater operating data sequence 28 with new starting processes is transmitted to the data memory 16 again via the connection 18.

Figure 2:
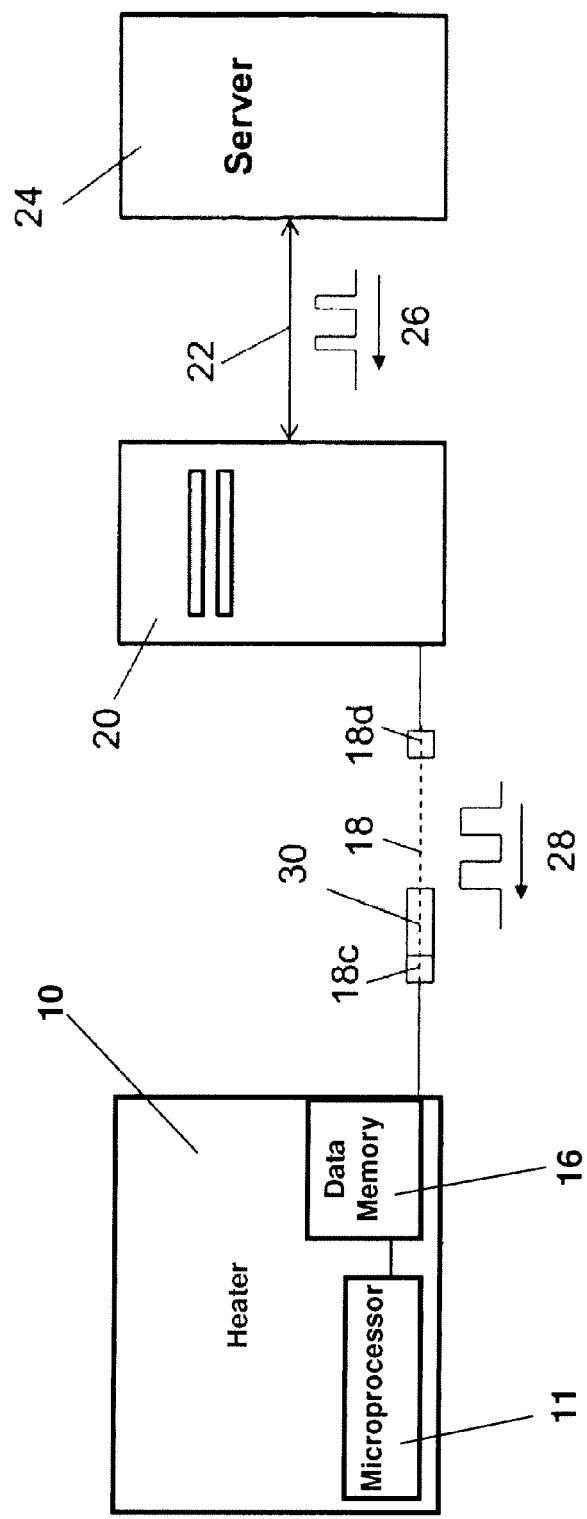
FIG. 2 is a schematic representation of a second embodiment of an arrangement for executing the process for triggering a heater for motor vehicles.

FIG. 2 shows a second embodiment of the arrangement for executing a process for triggering a motor vehicle heater 10 which largely conforms with the embodiment of FIG. 1, the data memory 16 here, however, being located directly in the heater 10 for motor vehicles. The connection 18 between the first computer 20 and the data memory 16 takes place here via USB connections 18c, 18d and the data storage medium with the USB connection 30, but here infrared interfaces 18a, 18b as in FIG. 1 can also be used.

The process for triggering a heater for motor vehicles according to the embodiment from FIG. 2 is described below:

As in the first embodiment, by a request to the second computer 24 from via the first computer 20, a first heater operating data sequence 26 is transmitted to the first computer 20. The heater operating data sequence 26 comprises at least information about the number of starting processes of the heater 10. Via the USB connection 18d, the second heater operating data sequence 28 is transmitted to the data storage medium by the USB connection 30. The data storage medium with the USB connection 30 can then be connected to the USB connection 18c and the second heater operating data sequence 28 can be connected to the data memory 16, by which a fixed number of starting processes is stored directly in the motor vehicle heater 10. Storage of the number of starting processes in the data memory 16 can be carried out both directly by the user of the heater 10 for motor vehicles, by a vehicle shop, or directly by the vendor of the heater 10.

Each time the heater 10 for motor vehicles is turned on, one stored starting process is used up. If only a small number of starting processes is stored on the data memory 16, this can be reported to the user on a display element (not shown) of the heater 10.

In another preferred embodiment of the invention, the second heater operating data sequence 28 also contains information about the duration of operation of the heater 10. In other preferred embodiments of the invention, the second heater operating data sequence 28 also comprises information about the heat output or about a time-dependent heat output profile of the heater 10. In these embodiments, each time the heater 10 for motor vehicles is turned on, a stored starting process, a certain duration of operation, a fixed heat output or a time-dependent heat output profile of the heater in the data memory 16 is used up. These operating quantities can also be loaded again in the above described manner into the data memory 16 by transmitting the second heater operating data sequence 28 to the data memory 16.

What is claimed is:

1. Process for activating an on-board heater in a motor vehicle, said motor vehicle heater having an associated heater housing and an associated data memory, comprising the steps of:

linking a first computer to a second computer via the Internet, causing the first computer to send a request signal to the second computer via the Internet, in response to said request signal causing the second computer to send to the first computer a first heater operating data sequence, transmitting a second heater operating data sequence which is dependent on the first heater operating data sequence from the first computer to the data memory associated with the motor vehicle heater, said first and second heater operating sequences having at least information about the number of permissible starting processes of the motor vehicle heater, wherein said heater is activated.

2. Process for activating a motor vehicle heater of claim 1, wherein said transmitting step is performed by transmitting the second heater operating data sequence to the data memory of the motor vehicle heater which is located in a remote control.

3. Process for activating a motor vehicle heater of claim 2, wherein the motor vehicle heater has a remote control receiving unit, wherein the transmitting step comprises transmitting a heater activation command which is dependent on the second heater operating data sequence from the remote control, via the remote control receiving unit, to the data memory.

4. Process for activating a motor vehicle heater of claim 1, wherein said data memory is located in said heater housing and wherein said transmitting step is performed by transmitting the second heater operating data sequence to the data memory of the motor vehicle heater which is located in the heater housing.

5. Process for activating a motor vehicle heater of claim 1, wherein both the data memory and the first computer have a USB connection and the second heater operating data sequence is transmitted from the first computer to the data memory using a data storage medium with a USB connection.

6. Process for activating a motor vehicle heater of claim 1, wherein the data memory and the first computer each have an infrared interface, and the second heater operating data sequence is transmitted from the first computer to the data memory using the infrared interfaces.

7. Process for activating a motor vehicle heater of claim 1, wherein the second heater operating data sequence contains information about the duration of operation of the heater.

8. Process for activating a motor vehicle heater of claim 1, wherein the second heater operating data sequence contains information about the heat output of the heater.

9. Process for activating a motor vehicle heater of claim 1, wherein the second heater operating data sequence contains information about the time-dependent heat output profile of the heater.

10. Process for activating a motor vehicle heater of claim 1, wherein a password is required for enabling said transmitting of the first heater operating data sequence from the second computer to the first computer.

11. Process for activating a motor vehicle heater of claim 1, wherein a financial transfer from the user is required for enabling said transmitting of the first heater operating data sequence from the second computer to the first computer.

* * * * *